(12) United States Patent
LiRosi

(10) Patent No.: US 6,244,948 B1
(45) Date of Patent: Jun. 12, 2001

(54) SHELLFISH OPENER AND METHOD

(76) Inventor: Salvatore LiRosi, 809 Eggerding Dr., Addison, IL (US) 60101

(*) Notice: Subject to any disclaimer, the term of this patent is extended or adjusted under 35 U.S.C. 154(b) by 0 days.

(21) Appl. No.: 09/352,962

(22) Filed: Jul. 14, 1999

(51) Int. Cl.[7] .................................................. A22C 29/04
(52) U.S. Cl. ............................................................ 452/16
(58) Field of Search ........................................ 452/16, 13

(56) References Cited

U.S. PATENT DOCUMENTS

| | | |
|---|---|---|
| D. 342,870 | 1/1994 | LeClair . |
| D. 358,307 | 5/1995 | Plamann . |
| 2,052,231 * | 8/1936 | Kanzler .................................. 452/16 |
| 2,296,049 * | 9/1942 | Plate ...................................... 452/16 |
| 2,571,214 * | 10/1951 | Dale ...................................... 452/16 |
| 4,069,552 | 1/1978 | Priggs . |
| 4,348,788 * | 9/1982 | Jurcak ................................... 452/16 |
| 4,393,546 | 7/1983 | Ruiz . |
| 4,395,823 | 8/1983 | Thibault . |
| 4,796,333 | 1/1989 | Stinson, Jr. . |
| 5,288,263 | 2/1994 | Ayala . |
| 5,334,080 | 8/1994 | Webb . |
| 5,482,500 | 1/1996 | Boettner . |

FOREIGN PATENT DOCUMENTS

66834 * 4/1984 (JP) ........................................ 452/16

* cited by examiner

*Primary Examiner*—Willis Little
(74) *Attorney, Agent, or Firm*—Charles F. Meroni, Jr.; Meroni & Meroni, P.C.

(57) ABSTRACT

The present invention concerns shellfish opener apparatus and a method of opening. The apparatus comprises a base and a handle attached to the base for rotating the handle about a first axis. The first axis is transversely defined through the base and can allow the handle to be rotated in 360 degree motion. A rack and pinion geared shaft is attached to the handle and is vertically aligned through the base for axially translating the rack and pinion geared shaft along a second axis that is perpendicular to the first axis. Axial translation along the second axis may be in an upward or downward motion. A punch, such as a wedge-shaped blade, is fixedly attached to the rack and pinion geared shaft for aligning and axially translating the punch means along the second axis for opening the shellfish. A collection and channeling structure, such as a trough, may be provided for receiving and supporting the shellfish and for collecting and channeling shellfish debris runoff during and after opening operations.

6 Claims, 3 Drawing Sheets

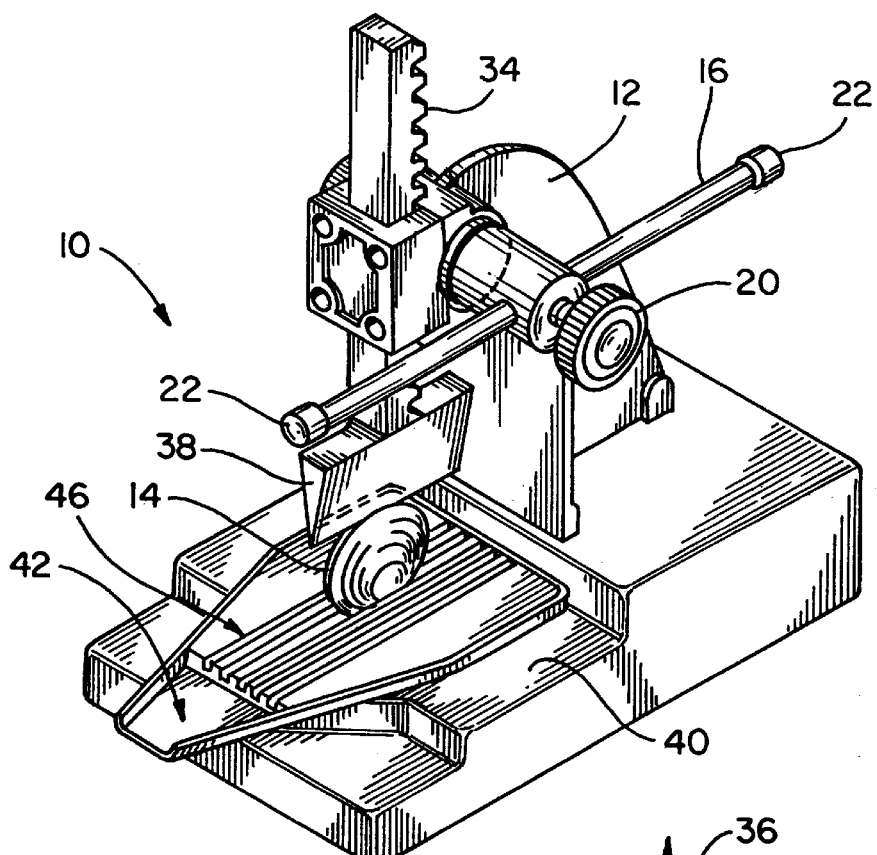
_Fig. 1_
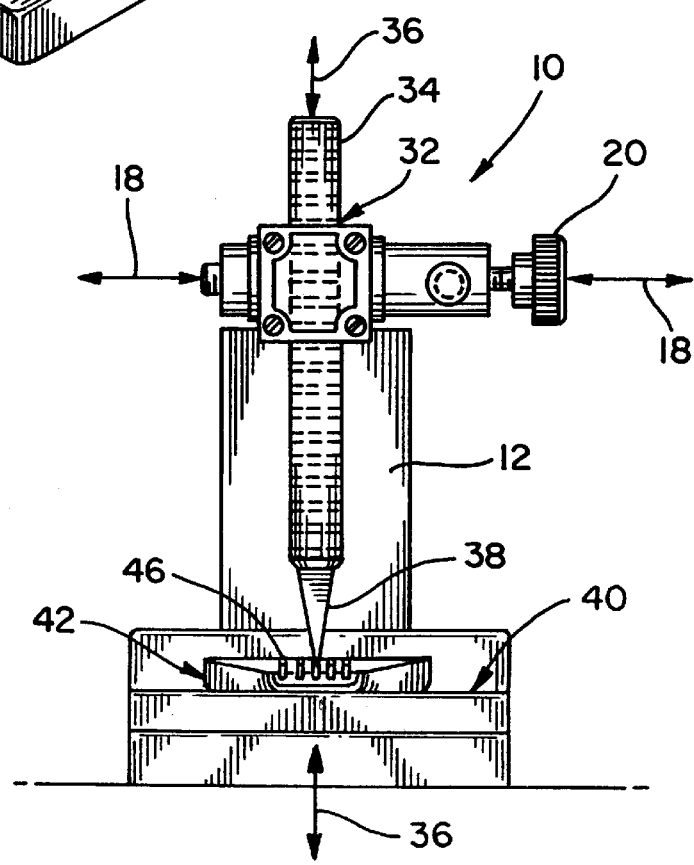
_Fig. 3_

SHELLFISH OPENER AND METHOD

BACKGROUND OF THE INVENTION

1. Field of the Invention

The present invention relates to opening devices. More specifically, the present invention is primarily intended as an opening device or apparatus for shellfish, including clams, oysters, and the like. A method of opening shellfish is also provided.

2. Description of the Related Art

In the art of opening shellfish, such as oysters, clams, and the like, the two hinged outer shells of the shellfish must be opened and the strong muscle binding or maintaining the outer shells must be torn, ruptured, or forced to an open position. In the past, a considerable degree of manual dexterity and skill has been required to perform this opening operation. These operations have been particularly dangerous, as the operator runs the risk of cutting and inflicting personal injury.

In recent years, many devices have been created for the purposes of enhancing shellfish opening operations. In particular, U.S. Pat. No. 4,348,788, which issued to Jurcak, discloses an Oyster Opener having an elongated lever with one end pivotally anchored to a mounting point for swinging movement of a free end having a handle portion. Though this device can enhance opening operations, the pivoting action and angular travel of the wedge member could cause an oyster to slip or move prior to penetration of the wedge member. In addition, debris runoff from the oyster, such as water and bodily fluids, can runoff of the base portion in any direction creating a slippery surface more prone to oyster slippage.

Moreover, U.S. Pat. No. 5,334,080, which issued to Webb and U.S. Pat. No. 5,482,500, which issued to Boettner et al. both disclose further opening devices that rely upon pivots and pivoting action of the handle and blade members. This pivoting action relies, at least in part, upon the strength of the operator as well as the moment arm created by the handle and blade positioning. In addition, the '500 device provides a structure that could pinch the operator's hands and that could channel debris runoff towards the pivoting portion of the handle structure.

Other pivoting-type openers are provided in the art, such as the Shell Fish Opener of U.S. Pat. No. 4,395,823, which issued to Thibault and the Shellfish Shucking Machine of U.S. Pat. No. 4,796,333, which issued to Stinson, Jr. et al. The '333 machine, in particular, provides a vertically movable knife structure that is operated by a handle structure that pivots about a pivot arm and tension spring assembly biasing the handle structure and the knife structure in an upward disposition. Again, operator arm strength and reliance on a moment arm are needed for use of this machine.

Finally, U.S. Pat. No. 4,069,552, which issued to Priggs, provides an opening tool that requires usage of both hands of a user to grip and squeeze two gripping portions of a spring-biased movable frame and blade structure. This device also requires the strength of the user to squeeze the device and force the blade into the shellfish and could cause personal injury, such as pinched fingers.

It therefore becomes highly advantageous to provide a shellfish opening device that can open shellfish, such as oysters, clams, and the like, with minimal operator strength and with maximum operator safety. It would also be highly advantageous for safety and health concerns, to provide a shellfish opening device that can collect and channel shellfish debris runoff away from the shellfish and the opening device. The present invention can provide these and other advantages, as is hereinafter explained.

Other objects of my invention, as well as particular features, elements, and advantages thereof, will be elucidated in, or apparent from, the following description and the accompanying drawing figures.

SUMMARY OF THE INVENTION

The present invention provides a shellfish opener apparatus and a method of opening shellfish and the like using the apparatus. The present invention can also provide a shellfish opening device that can open shellfish, such as oysters, clams, and the like, with minimal operator strength and with maximum operator safety. In response to safety and health concerns, the shellfish opening device can also collect, contain and channel shellfish debris runoff away from the shellfish and the opening device.

According to the present invention a device for opening shellfish is provided and comprises a base and a handle attached to the base for rotating the handle about a first axis. The first axis is transversely defined through the base for rotation of the handle in 360 degree motion. The handle may also be adjustable. A rack and pinion geared shaft is attached to the handle and can be vertically aligned through the base for axially translating the rack and pinion geared shaft along a second axis. The second axis is perpendicular to the first axis and may run in a vertical direction with the shaft axially translating in an upward or downward vertical translation. Punch means, such as a wedge-shaped integrated blade structure, is fixedly attached to the rack and pinion geared shaft for aligning and axially translating the punch means along the second axis for opening the shellfish. Hence, the punch means may axially translate in vertical incremental upward or downward motion along the second axis for uniformly opening the shellfish. In addition, a collection and channeling structure, such as a trough, may be attached to an upper face of the base and aligned with the rack and pinion geared shaft and the punch means for supporting, collecting, and channeling debris runoff of the shellfish. Such channeling may be directed away from the punch means and from the base.

In another embodiment of the present invention, an apparatus for opening shellfish comprises a base and a handle attached to the base for rotating the handle about a first axis transversely directed through the base. A gearing mechanism is housed within the base and is connected to the handle for rotating the gearing mechanism about the first axis. Then punch means, such as a blade structure, is gearingly connected to the gearing mechanism for vertical upward and downward translation along a second axis, such as a vertical axis, that is perpendicular to the first axis. The handle and gearing mechanism is provided for incrementally actuating the punch means along the second axis.

In a further embodiment of the present invention, a shell opening device comprises a body frame housing a gearing mechanism for actuation by a handle structure. The body frame has a substantially planar surface. Next, a wedge-shaped blade structure that includes corresponding gearing for incremental geared connection to the gearing mechanism is provided. The wedge-shaped integrated blade structure is vertically aligned for axial translation in upward and downward motion along a longitudinal axis running perpendicular to the substantially planar surface of the body frame. Finally, a trough structure is attached to the substantially planar surface of the body frame for receiving the wedge-shaped blade structure.

A method of opening shellfish according to the principles of the present invention is also provided. The method comprises the acts of first, providing a base structure having a trough for receiving shellfish, a handle structure, and a geared integrated blade structure and for containing and channeling debris away from the wedge-shaped integrated blade structure. Then, placing the shellfish on the trough is performed followed by rotating the handle structure about a first axis and actuating the geared blade structure along a second axis perpendicular to the first axis. During rotation and actuation the geared blade structure is incrementally and uniformly moved in a direction along the second axis while rotating the handle structure. This direction can be upwards or downwards, along the second axis, in opposing directions. Finally, the incremental and uniform motion causes contacting and opening of the shellfish in the direction along the second axis using the geared blade structure. Moreover, the method can include catching and channeling shellfish debris runoff into and out of the trough.

DESCRIPTION OF THE DRAWINGS

Other features of my invention will become more evident from a consideration of the following detailed description of my patent drawings, as follows:

FIG. 1 is a perspective view of a shellfish opener apparatus of the present invention;

FIG. 3 is a side view along an end of the apparatus of FIG. 1;

DETAILED DESCRIPTION OF THE PREFERRED EMBODIMENT

Figure 2:
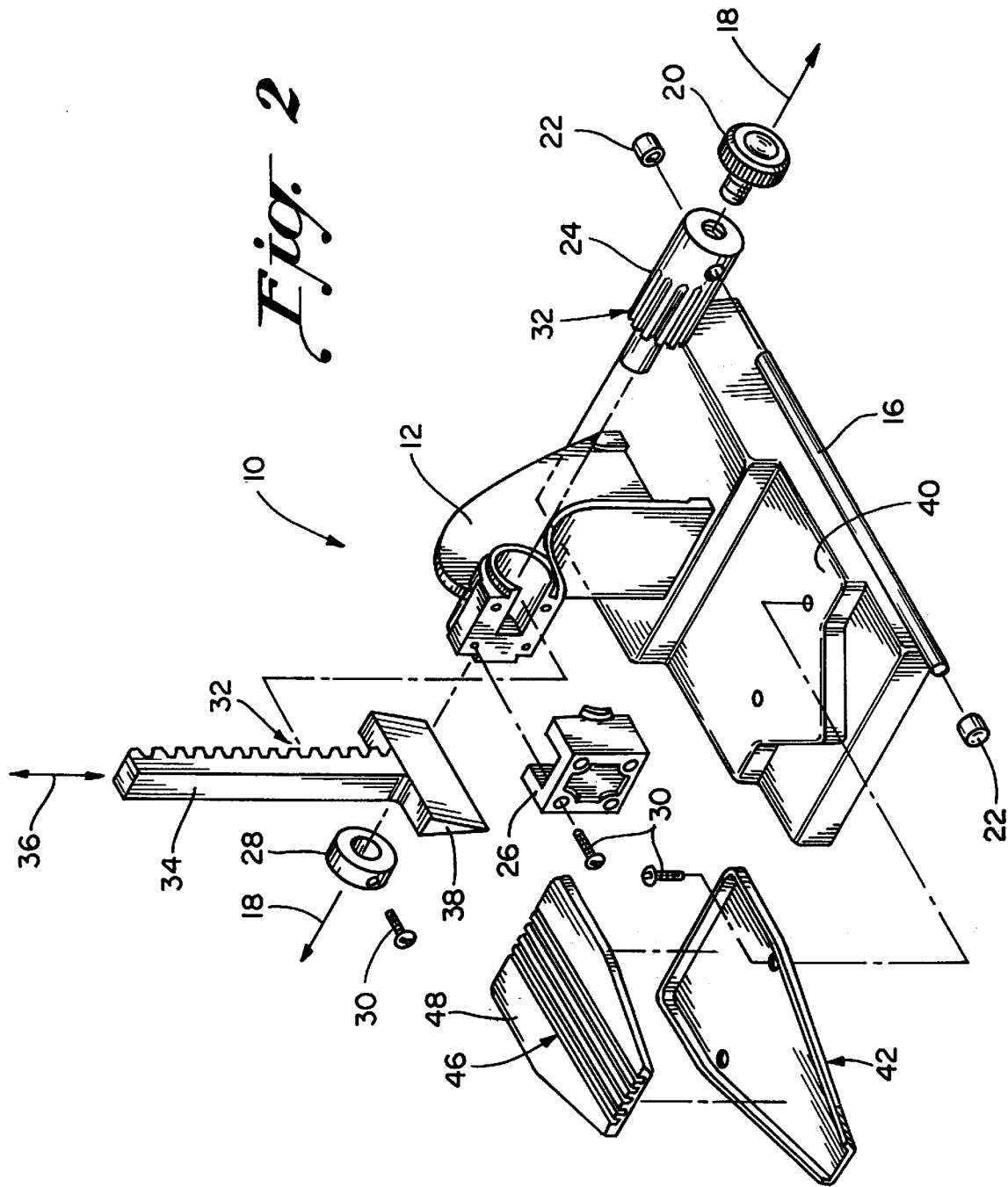
FIG. 2 is an exploded view in perspective of the apparatus of FIG. 1.

Referring now to the drawings, the present invention concerns a device or apparatus for opening shellfish, such as oysters, clams, and the like, as illustrated in FIGS. 1–5. A method of opening shellfish is also provided. It is not intended that the present invention be limited solely to usage for shellfish, and usage with other shelled animals, foods, and so forth, such as crabs and nuts, are intended to be included within the scope of the present invention.

The present invention provides a shellfish opening device that can open shellfish, such as oysters, clams, and the like, with minimal operator strength and with maximum operator safety. Moreover, in response to safety and health concerns, the present invention can collect and channel shellfish debris runoff away from the shellfish and the opening device.

As is illustrated in FIG. 1, the device or apparatus 10 comprises a base 12 or body frame for supporting the other working elements hereinafter described as well for supporting the shellfish 14, or other food, etc. that is to be opened. The base 12, as well as the other elements later described, may be constructed of materials that will withstand the forces incident to operation, as is known in the art, as well as be cost-efficient and lightweight. The base 12 may be sized and configured, as is shown in FIGS. 1–5, for supporting the gearing, blade, and handle structures on various surfaces, such as a table. However, other configurations and sizes are contemplated as within the scope of the present invention, whether for personal or commercial use, and that which is shown in FIGS. 1–5 is intended solely as an illustration of the present invention.

Figure 4:
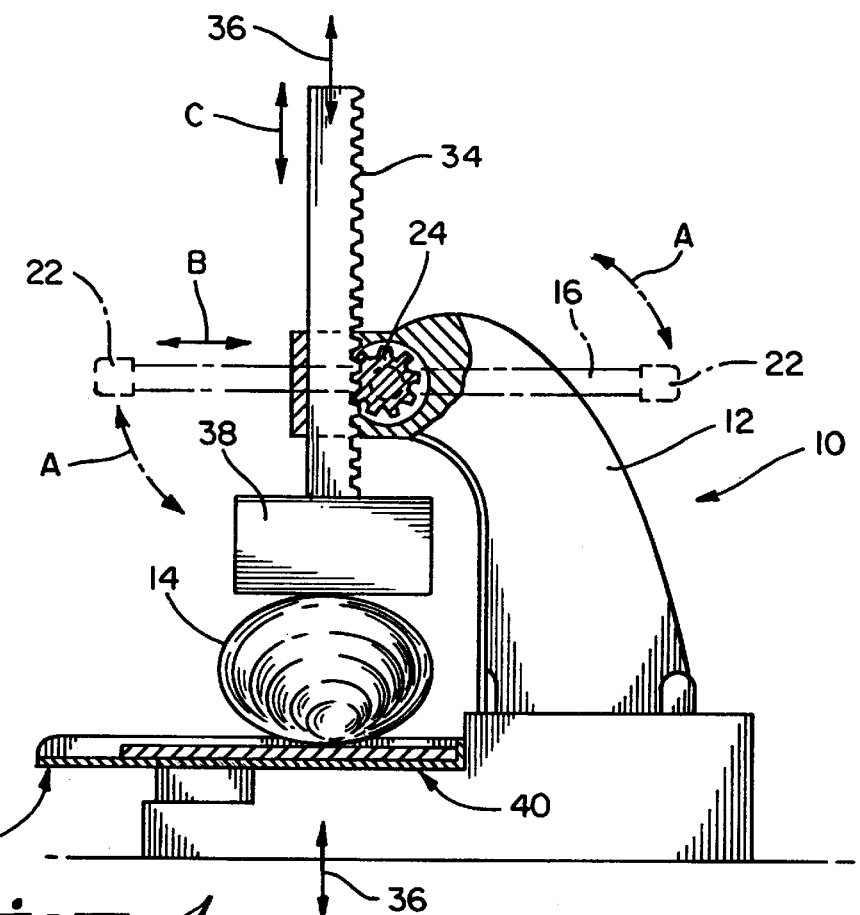
FIG. 4 is a side view of the apparatus of FIG. 1 showing rotation of a handle structure about a first axis and corresponding actuation of a blade structure along a second axis for opening a shellfish.

A handle 16 may be attached to the base 12, as shown in FIGS. 1–5, for rotating, (illustrated by arrow A) the handle 16 about a first axis 18 (shown in FIG. 3) that is oriented transversely through the base 12. The handle 16 may be located in many configurations with respect to the base 12, however it is important that the handle 16 be configured and attached to the base 12 with the capability of 360 degree rotation about the first axis 18. In this way, the device 10 may be used in such a way as to prevent operator injury due to handle and blade movements. In addition, the handle 16 may be adjustable, such as is shown in FIG. 4 with arrow B. Adjustability of the handle 16 may be used, for example, for increasing the torque applied to gearing and blade structures. An adjustment means 20, shown in FIGS. 1–3, may be used for loosening the handle 16 or tightening the same. Caps 22 may be used for gripping purposes and the like.

As is illustrated in FIGS. 1–5, the handle 16 may then be attached to a gearing mechanism 24, such as a spur gear, for facilitating or actuating the opening operation. The gearing mechanism 24 may be housed within the base 12 and secured therein by collar 26 and component 28, both of which may be secured to the base 12 by fasteners 30. In a preferred embodiment, the gearing mechanism 24 forms a part of a rack and pinion gearing system 32 for the opening operations, illustrated in motion in FIG. 4. The gearing mechanism 24 can rotate about the first axis 18, arrow A. Usage of the rack and pinion system 32 can provide a significant advantage in the opening operations of shellfish 14 as the system 32 can transfer rotational forces from the rotating handle 16 (arrow A), through the gearing mechanism 24, into linear/axial vertical forces that can open the shellfish 14 and the like (shown operating in a direction illustrated by arrow C in FIG. 4). The system 32 also can provide an advantage in holding a stationary position during the opening operations, if the handle 16 is released during rotation. In this manner, the system 32 can assist an operator of the device 10 in opening operations without relying solely upon a moment arm or operator'arm strength, and the device 10 can maintain an amount of force on the shellfish 14 once force is applied to the shellfish 14 by virtue of the system 32.

Figure 5:
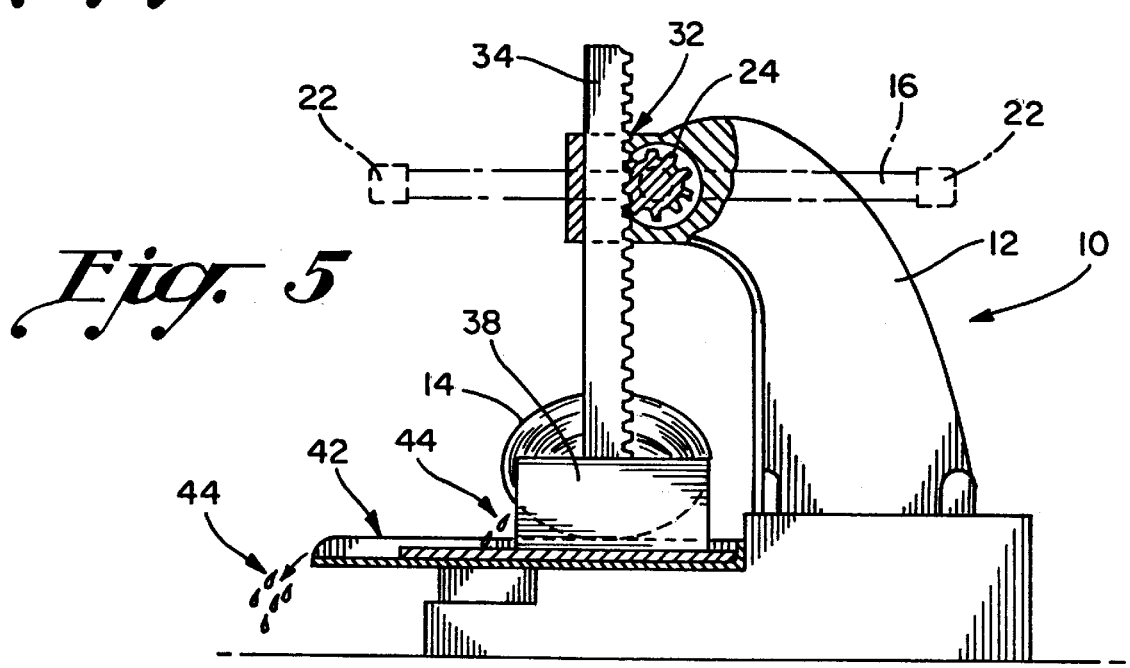
FIG. 5 is a side view of the apparatus of FIG. 5 showing opening of the shellfish and shellfish debris runoff from a trough.

A rack and pinion geared shaft 34, shown in FIGS. 1–5, also forms a significant part of the rack and pinion system 32. The shaft 34 is attached to the handle 16, as shown in FIGS. 1–5, by the gearing mechanism 24 and both can be housed within the base 12 and secured therein by the collar 26 for allowance of vertical/axial movement in the direction of arrow C. It is important that the shaft 34 be allowed to move in an upward and downward direction (arrow C) incrementally and that the shaft 34 contact the gearing mechanism 24 for actuation of the opening operations; this contact also can form a part of the system 32. In a preferred embodiment, the shaft 34 is vertically aligned through the base 12 for axially translating the shaft 34 along a second axis 36 (i.e. a longitudinal axis), shown in FIG. 4, that can be located perpendicular to the first axis 18. Preferably, axial translation is located in the vertical direction, shown by arrow C, and is located such that the opening operations may operate to open the shellfish 14 along the seam between its shells, with the shellfish positioned, as shown in FIGS. 1, 4, and 5 on the device 10.

As to the opening operation, a punch means 38, or blade structure, may be attached to the shaft 34 at one end of the shaft. The punch means 38 may be located for acting against the shellfish 14 when pressed upon the shellfish in such a way as to open the shellfish and/or rupture the muscles found therein. As is shown in FIGS. 1–5, the punch means 38 may include a wedge-shaped blade structure that is downwardly directed with the opening edge found directed towards the shellfish 14 ultimately to be opened. Other blade structures and types may be used, such as pointed blades, rounded blades, and so forth. The punch means 38 may also have a substantially uniform blade edge, as is shown in FIGS. 1–5, although other edges are contemplated.

The punch means 38 may also be attached to the shaft 34 by fasteners and the like, by welding, or as illustrated in FIGS. 1–5, by being a part of the shaft 34 itself or vice-versa. Hence, the punch means 38 could include a shaft having gearing linearly directed along an outer surface and all forming an integrated blade structure. In a preferred embodiment, the punch means 38 is sized, configured, and positioned for translation along the second axis 36 (arrow C) and in a direction perpendicular to a base surface 40 or the base 12.

In addition, a collection and channeling structure 42, shown in FIGS. 1–5, may be attached to the base 12, such as to the base surface 40 for receiving and supporting the shellfish 14 during opening operations. The collection and channeling structure 42 may also be sized and configured for channeling debris runoff 44 of the shellfish 14 away from the device 10, and particularly away from the base 12, as is shown in FIG. 5, by extension and the like. The collection and channeling structure 42 may be a trough structure, or any other structure that will receive, support, and channel away debris from the base 12. The structure 42 may also comprise parallel grooved structures 46 and a pad 48, as shown in FIG. 3, for further supporting the shellfish 14 or other commodity to be opened by the device 10. The parallel grooved structures 46 and the structure 42 may be aligned, such as parallely aligned, with the edge of the punch means 38.

Finally, in usage the present invention provides a method of opening the shellfish 14, as illustrated in FIGS. 4 and 5. In action, the device 10 may be used by placing the shellfish 14 on the structure 42, then the handle 16 is rotated about the first axis 18 in the direction of arrow A. If the handle is rotated, in a counter-clockwise direction, the gearing mechanism 24 could rotate about the first axis 18 in a counter-clockwise direction and could coact with the shaft 34 and the punch means 38 to translate the shaft and punch means along the second axis 36 (arrow C) in a downward direction. In contrast, rotation of the handle 16 in a clockwise direction could translate the shaft 34 and punch means 38 in an upward direction, hence removing the punch means 38 following opening of the shellfish 14. Other rotations, gearing, and so forth, are intended to be contemplated herein and that which is detailed and illustrated is meant to be illustrative and as an example of the present invention.

Moreover, as the handle 16 and punch means 38 are rotated and moved respectively, the device 10 may operated to incrementally and uniformly move the punch means 38 along the second axis 36 for systematically and uniformly opening the shellfish 14. As the shellfish is opened and debris runoff 44 is released therefrom, the structure 42 can provide a means for collecting and channeling the debris runoff 44 away from the device 10 in a controlled manner, as shown in FIG. 5.

Therefore the present invention can provide a shellfish opening device that can open shellfish, such as oysters, clams, and the like, with minimal operator strength and with maximum operator safety. The present invention can also provide for safety and health concerns, by providing a shellfish opening device that can collect and channel shellfish debris runoff away from the shellfish and the opening device.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

What is claimed is:

1. A device for opening shellfish comprising:
    a base;
    a handle attached to the base for rotating the handle about a first axis transversely defined through the base;
    a rack and pinion geared shaft attached to the handle, the rack and pinion geared shaft being vertically aligned through the base for axially translating the rack and pinion geared shaft along a second axis perpendicular to the first axis; and
    punch means fixedly attached to the rack and pinion geared shaft forming an integrated blade structure for aligning and axially translating the punch means along the second axis for opening the shellfish,
        the base further comprising a collection and channeling structure attached to an upper face of the base and aligned with the rack and pinion geared shaft and the punch means for supporting, collecting, containing, and channeling debris runoff of the shellfish, the collection and channeling structure comprising a planar surface substantially enclosed by an upturned rim having an opening located therein, the opening being directed outwards from the base.

2. The device of claim 5, wherein the collection and channeling structure is a trough sized and configured for channeling the debris runoff away from the punch means and from the base.

3. The device of claim 2, wherein the trough extends over and beyond the upper surface of the base for channeling the debris runoff away from the punch means and from the base.

4. The device of claim 2, wherein the trough comprises parallely directed grooves for supporting the shellfish and for channeling the debris runoff away from the punch means and from the base, the trough and the parallely directed grooves being oriented substantially parallel to the substantially uniform blade edge of the wedge-shaped blade.

5. An apparatus for opening shellfish comprising:
    a base;
    a handle attached to the base for rotating the handle about a first axis transversely directed through the base;
    a gearing mechanism housed within the base and connected to the handle for rotating the gearing mechanism about the first axis;
    punch means gearingly connected to the gearing mechanism for vertical upward and downward translation along a second axis perpendicular to the first axis, the handle and the gearing mechanism for incrementally actuating the punch means, the punch means forming a single-piece integrated blade structure; and
    a trough attached to the base and aligned with the punch means for supporting the shellfish and for containing and channeling debris runoff away from the punch means and the base, the trough comprising a planar surface substantially enclosed by an upturned rim having an opening located therein, the opening being directed outwards from the base.

6. A shell opening device comprising:

a body frame housing a gearing mechanism for actuation by a handle structure, the body frame having a substantially planar surface;

a wedge-shaped integrated blade structure including corresponding gearing for incremental geared connection to the gearing mechanism, the wedge-shaped integrated blade structure being vertically aligned for axial translation in upward and downward motion along a longitudinal axis running perpendicular to the substantially planar surface of the body frame; and a trough structure attached to the substantially planar surface of the body frame for receiving the wedge-shaped integrated blade structure, the trough structure comprising a planar surface substantially enclosed by an upturned rim having an opening located therein, the opening being directed outwards from the body frame.

* * * * *